(12) United States Patent
Wang et al.

(10) Patent No.: US 10,782,713 B2
(45) Date of Patent: Sep. 22, 2020

(54) FLUID REGULATOR

(71) Applicant: EMERSON PROCESS MANAGEMENT REGULATOR TECHNOLOGIES, INC., McKinney, TX (US)

(72) Inventors: Min Wang, Chengdu (CN); Guolei Fan, Chengdu (CN); David Davis, Whiteright, TX (US); Tung K. Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 16/190,528

(22) Filed: Nov. 14, 2018

(65) Prior Publication Data
US 2020/0133317 A1 Apr. 30, 2020

(30) Foreign Application Priority Data
Oct. 29, 2018 (CN) ........................ 2018 1 1266040

(51) Int. Cl.
G05D 11/00 (2006.01)
G05D 16/16 (2006.01)
G05D 16/10 (2006.01)

(52) U.S. Cl.
CPC ......... *G05D 16/163* (2013.01); *G05D 16/106* (2013.01); *Y10T 137/261* (2015.04); *Y10T 137/7831* (2015.04)

(58) Field of Classification Search
CPC .... F16B 21/18; F16B 21/186; Y10T 137/261; Y10T 137/7831

USPC .................................................. 251/327, 337
See application file for complete search history.

(56) References Cited

U.S. PATENT DOCUMENTS

| | | | | |
|---|---|---|---|---|
| 2,886,355 A | * | 5/1959 | Wurzel | F16B 21/183 403/326 |
| 3,042,064 A | * | 7/1962 | Pommersheim | F16K 31/165 137/116.5 |
| 3,705,599 A | * | 12/1972 | Sheward | G05D 16/0688 137/116.5 |
| 8,739,819 B2 | | 6/2014 | Foust et al. | |
| 9,213,339 B2 | | 12/2015 | Nashery et al. | |
| 2009/0261281 A1 | * | 10/2009 | Mevius | F16K 31/165 251/118 |

(Continued)

OTHER PUBLICATIONS

CSB400 Series Commercial/Industrial Pressure Reducing Regulators Instruction Manual dated Feb. 2016.

*Primary Examiner* — Robert K Arundale
(74) *Attorney, Agent, or Firm* — Marshall, Gerstein & Borun LLP (57) ABSTRACT

A fluid regulator includes a balance port regulator valve and an actuator coupled to the regulator valve. The regulator valve has an inlet, an outlet, a valve port disposed between the inlet and the outlet, and a valve disc movable along a longitudinal axis between a closed position in which the valve disc sealingly engages the valve port and an open position in which the valve disc is spaced apart from the valve port. The actuator is responsive to fluid pressure to move an actuator stem along the longitudinal axis. A connector assembly operably and removably connects the valve disc to the actuator stem.

19 Claims, 7 Drawing Sheets

(56) References Cited

U.S. PATENT DOCUMENTS

| | | | |
|---|---|---|---|
| 2011/0174381 A1 | 7/2011 | Foust et al. | |
| 2012/0103440 A1* | 5/2012 | Chizek | G05D 16/0688 137/528 |
| 2012/0104303 A1* | 5/2012 | Chizek | G05D 16/0688 251/324 |
| 2014/0083528 A1* | 3/2014 | Mevius | F16K 17/32 137/505 |
| 2014/0090726 A1* | 4/2014 | Hawkins | G05D 16/0694 137/505.13 |
| 2014/0174565 A1* | 6/2014 | Yunxia | F16K 17/04 137/505 |
| 2014/0261724 A1 | 9/2014 | Fan et al. | |
| 2015/0259065 A1* | 9/2015 | Wills | B64C 27/56 403/161 |
| 2016/0278899 A1* | 9/2016 | Heller | A61K 31/198 |
| 2018/0058596 A1* | 3/2018 | Hawkins | F16K 31/1262 |

* cited by examiner

FLUID REGULATOR

CROSS-REFERENCE TO RELATED APPLICATIONS

This application claims priority to Chinese Patent Application No. 201811266040.5, entitled "Fluid Regulator" and filed Oct. 29, 2018, the entire disclosure of which is hereby incorporated by reference herein.

FIELD OF THE INVENTION

This disclosure relates generally to fluid regulators and, more particularly, to fluid regulators having a balanced port regulator valve with a balanced trim assembly.

BACKGROUND

Fluid regulators are commonly employed in fluid or gas distribution systems, for example in the gas or power industries, to control the pressure in the system downstream of the fluid regulator. The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a fluid regulator. Therefore, fluid regulators are implemented into these distribution systems to ensure that the delivered gas meets the requirements of the end-user facilities. Conventional fluid regulators generally include a closed-loop control actuator for sensing and controlling the pressure of the delivered gas.

In addition to a closed loop control, some conventional fluid regulators include balanced port regulator valves having a balanced trim assembly to improve the reaction of the fluid regulator to variations in the downstream pressure. The balanced trim assembly is adapted to reduce the influence of the upstream pressure on the performance of the fluid regulator. Because fluid pressure at the valve inlet acts on a first face of the valve disc, the fluid regulator responds differently at different inlet pressures (e.g., the fluid regulator is further open at high inlet pressures than at low inlet pressures). To combat this problem, balanced port regulator valves direct fluid at the inlet through channels that extend through the valve disc and act upon a balancing diaphragm in a direction opposite to the direction in which the inlet fluid acts on the face of the valve disc. Accordingly, as the upstream pressure varies, a corresponding force is applied to balance the force created by the upstream pressure, as described further below, so that the fluid regulator acts in response to the downstream pressure only. As used herein, a balanced port regulator valve is a regulator valve in which a force that operates on a valve member such as a valve disc is balanced by an opposing force.

One issue that can be encountered with conventional fluid regulators having a balanced port regulator valve with a balanced trim assembly is that the balanced trim assembly can affect the speed of response of the fluid regulator. Specifically, because the balanced trim assembly and the actuator stem of the actuator in conventional fluid regulators are not connected, the balanced trim assembly may not move, even when the actuator stem moves away from the balanced trim assembly, causing the regulator to respond slowly when downstream pressure demand is greater.

SUMMARY

In accordance with one exemplary aspect of the present invention, a fluid regulator comprises a balanced port regulator valve and an actuator. The regulator valve has an inlet, an outlet, a valve port disposed between the inlet and the outlet, and a valve disc movable along a longitudinal axis between a closed position in which the valve disc sealingly engages the valve port and an open position in which the valve disc is spaced apart from the valve port. The actuator is coupled to the regulator valve and is responsive to fluid pressure to move an actuator stem along the longitudinal axis. A connector assembly operably and removably connects the valve disc to the actuator stem.

In further accordance with any one or more of the foregoing exemplary aspects of the present invention, a fluid regulator may further include, in any combination, any one or more of the following preferred forms.

In one preferred form, movement of the actuator stem along the longitudinal axis in a direction away from the valve port moves the valve disc along with the actuator stem in the direction away from the valve port.

In another preferred form, the connector assembly comprises a retainer and a first end of the retainer is secured to the valve disc and a second end of the retainer is connected to the actuator stem.

In another preferred form, the valve disc is secured to the retainer through a valve stem.

In another preferred form, the connector assembly comprises a snap ring that removably connects the retainer to the actuator stem.

In another preferred form, the retainer comprises a generally cylindrical body, a cylindrical cavity extending longitudinally into the body, and a circumferential groove formed in a wall of the cavity.

In another preferred form, the actuator stem comprises a generally cylindrical body and an circumferential groove formed around an outer surface of the body at an end of the body.

In another preferred form, the end of the body of the actuator stem extends into the cavity of the retainer and the snap ring engages the circumferential groove in the retainer and the circumferential groove in the actuator stem to removably connect the retainer to the actuator stem.

In another preferred form, the snap ring comprises two parallel main arms, a transverse arm, and arcuate first and second retaining arms. The main arms are configured to engage the groove in the actuator stem and the transverse arm extends between and connects first ends of the main arms. The first retaining arm extends from a second end of one of the main arms and the second retaining arm extends from a second end of the other of the main arms. The transverse arm and the first and second retaining arms extend into and engage the groove in the retainer.

In another preferred form, the regulator valve comprises a biasing element that is configured to urge the valve disc away from the valve port.

In another preferred form, the regulator valve has a diaphragm and a pressure at the inlet acts on the diaphragm to urge the valve disc toward the valve port.

In accordance with another exemplary aspect of the present invention, a connector assembly for a fluid regulator comprises a retainer and a removable connector. The retainer is operably connected to a valve disc of a regulator valve of the fluid regulator and the removable connector is configured to removably connect the retainer to an actuator stem of an actuator of the fluid regulator.

In further accordance with any one or more of the foregoing exemplary aspects of the present invention, a connector assembly for a fluid regulator may further include, in any combination, any one or more of the following preferred forms.

In one preferred form, the valve disc is operably connected to the retainer through a valve stem and the valve disc is movable along a longitudinal axis between a closed position, in which the valve disc sealingly engages a valve port of the regulator valve, and an open position, in which the valve disc is spaced apart from the valve port.

In another preferred form, movement of the actuator stem along the longitudinal axis in a direction away from the valve port moves the valve disc along with the actuator stem in the direction away from the valve port.

In another preferred form, the retainer comprises a generally cylindrical body, a cylindrical cavity extending longitudinally into the body, and a circumferential groove formed in a wall of the cavity.

In another preferred form, the actuator stem comprises a generally cylindrical body and an circumferential groove formed around an outer surface of the body at an end of the body.

In another preferred form, the removable connector comprises a snap ring.

In another preferred form, the end of the body of the actuator stem extends into the cavity of the retainer and the snap ring engages the circumferential groove in the retainer and the circumferential groove in the actuator stem to connect the retainer to the actuator stem.

In another preferred form, the snap ring comprises two parallel main arms, a transverse arm, and arcuate first and second retaining arms. The main arms are configured to engage the groove in the actuator stem and the transverse arm extends between and connecting first ends of the main arms. The first retaining arm extends from a second end of one of the main arms and the second retaining arm extending from a second end of the other of the main arms. The transverse arm and the first and second retaining arms extend into and engage the groove in the retainer.

In another preferred form, the retainer comprises a surface that is configured to receive a biasing element that is configured to urge the retainer toward the actuator stem.

DETAILED DESCRIPTION

Figure 1A:
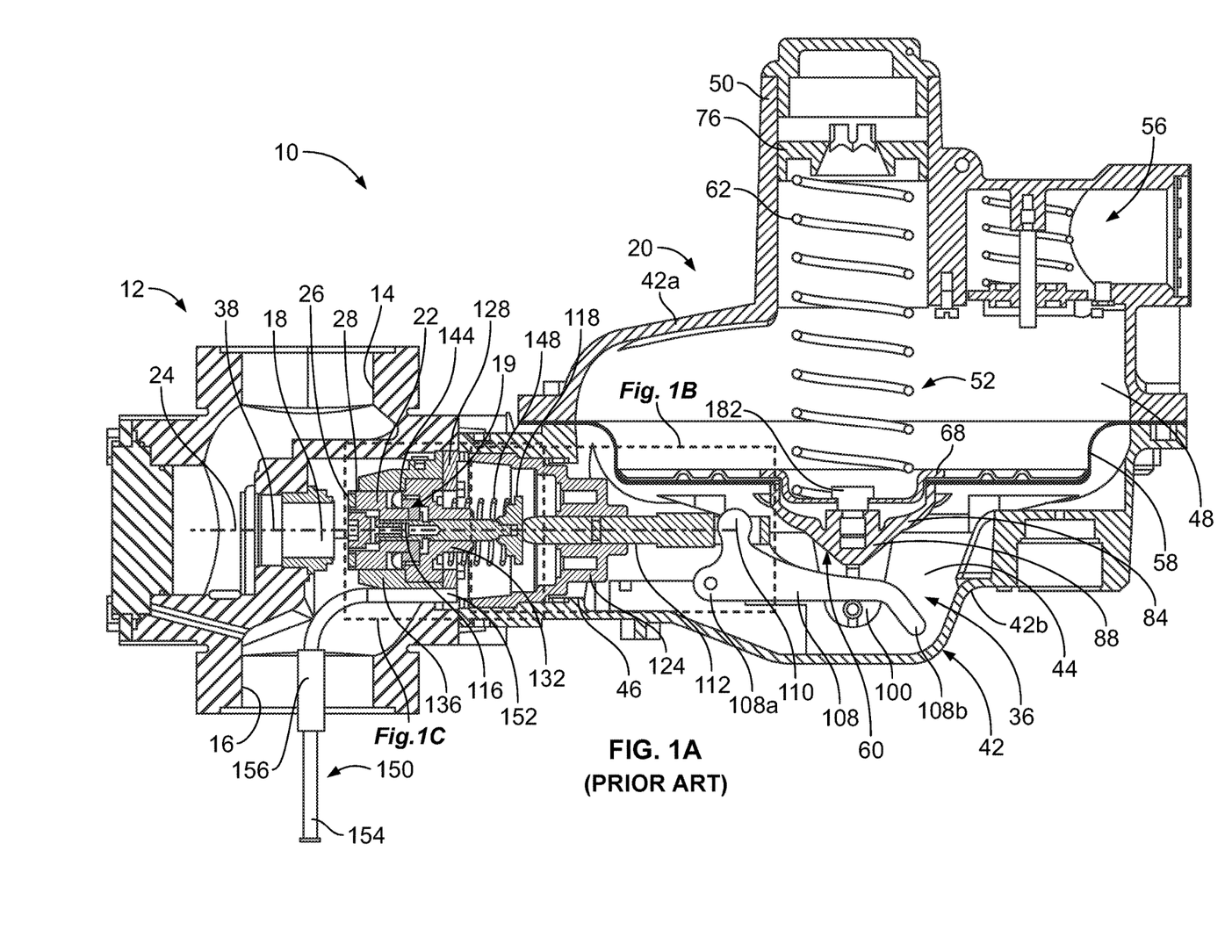
FIG. 1A is a partial cross-sectional view of a conventional fluid regulator with a balanced port regulator valve having a balanced trim assembly.
Figure 1B:
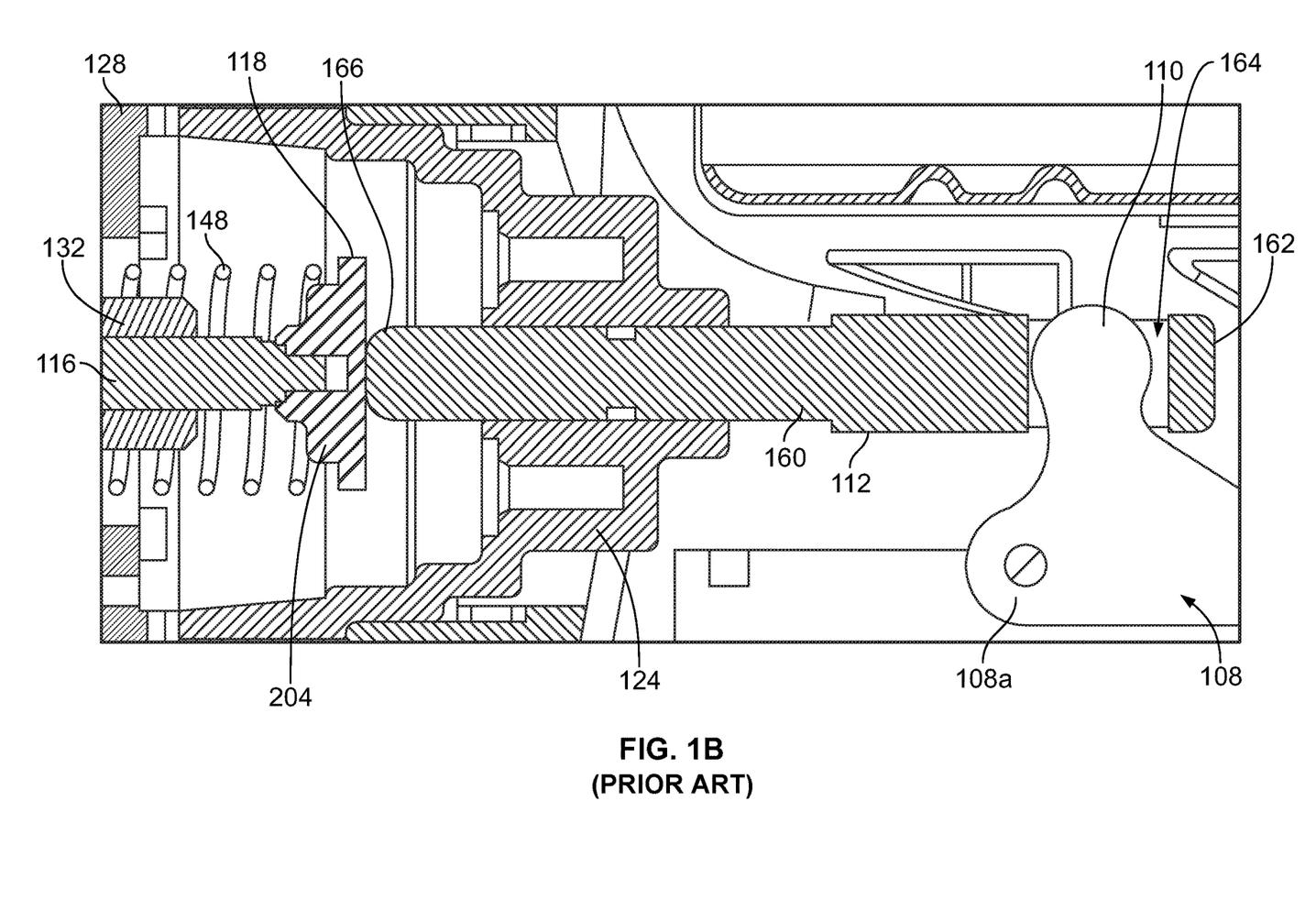
FIG. 1B is an enlarged view of a portion of the fluid regulator of FIG. 1A.
Figure 1C:
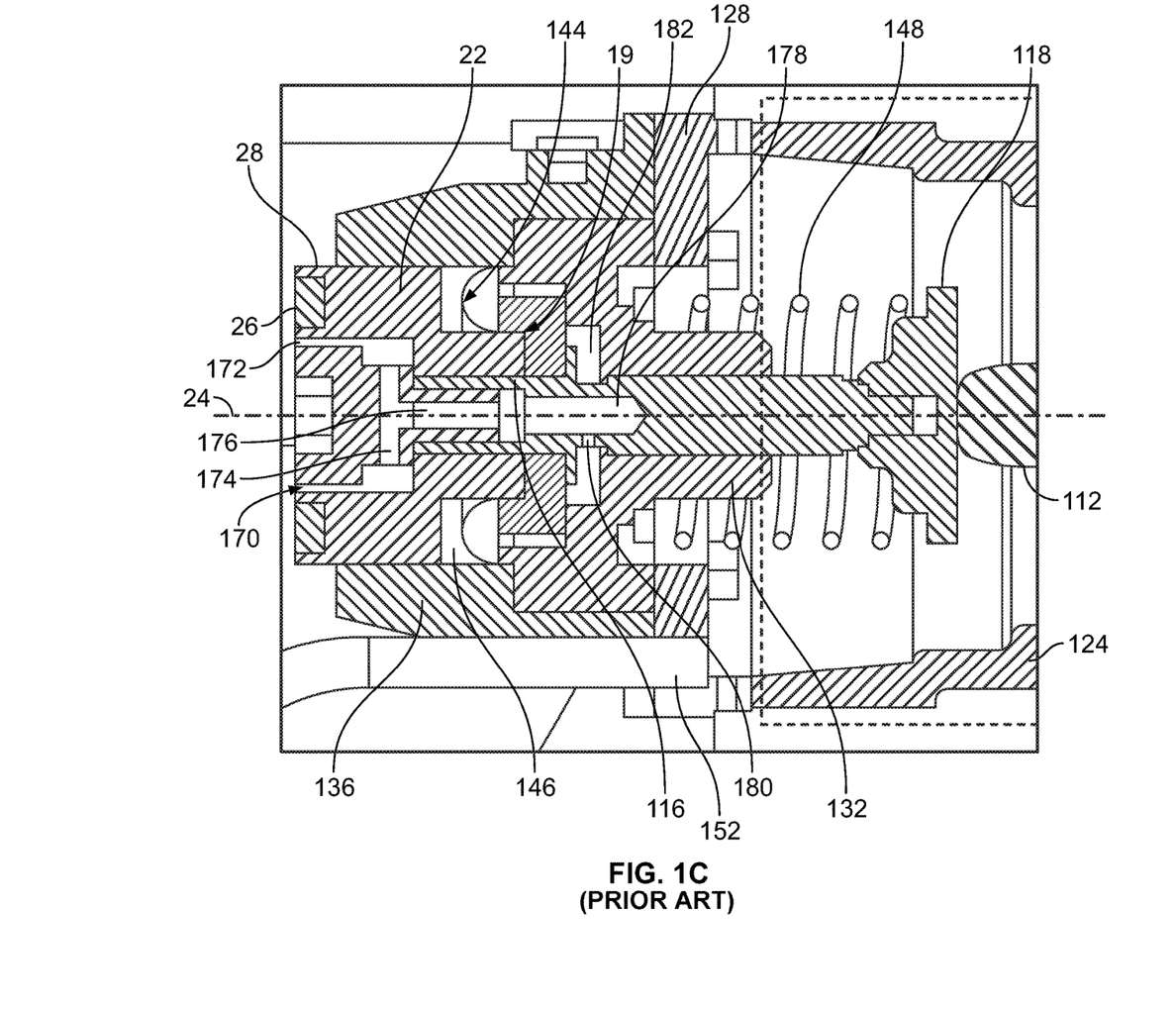
FIG. 1C is an enlarged view of another portion of the fluid regulator of FIG. 1A.

FIGS. 1A-1C illustrate a conventional fluid regulator 10 that includes a balanced port regulator valve 12 and an actuator 20 coupled to balanced port regulator valve 12. Balanced port regulator valve 12 has an inlet 14, an outlet 16, a valve port 18 disposed between inlet 14 and outlet 16, and a balanced trim assembly 19 disposed within balanced port regulator valve 12 and adapted for displacement along a longitudinal axis 24 between a closed position, sealingly engaging valve port 18, and an open position, disposed away from valve port 18. Inlet 14 can receive gas from a gas distribution system and outlet 16 can deliver gas to, for example, a facility having one or more appliances. Balanced port regulator valve 12 defines a throat 38 disposed between inlet 14 and outlet 16, which has valve port 18 disposed therein. Fluid must travel through valve port 18 to travel between inlet 14 and outlet 16. Valve port 18 may be removable from balanced port regulator valve 12 such that it may be replaced with a different valve port having a bore of a different diameter or configuration to tailor operational and flow characteristics of balanced port regulator valve 12 to a specific application.

Balanced trim assembly 19 includes valve disc 22, valve stem 116, which is secured to valve disc 22 by threads, welding, etc., and stem plate 118 secured to valve stem 116 by threads, welding, etc. Balanced trim assembly 19 and actuator stem 112 are supported for linear movement by a stem guide 124, a retainer plate 128, a balancing diaphragm retainer 132 and a balancing port housing 136. Stem guide 124 is configured to fit within an actuator mouth 46 and includes a generally cylindrical inner portion that slidably retains actuator stem 112. Stem guide 124 engages retainer plate 128, which is disposed between stem guide 124 and balanced port housing 136, to hold retainer plate 128 and balanced port housing 136 in place. Retainer plate 128 is generally circular and includes a central opening through which valve stem 116 passes. Balanced port housing 136 is generally cylindrical and hollow, extends toward valve port 18, and has an inner diameter sized to slidably receive valve disc 22. Balancing diaphragm retainer 132 is disposed within balancing port housing 136 and the opening of retainer plate 128, and is held in place between a surface of retainer plate 128 and an inner shoulder of balancing port housing 136. A disc-shaped balancing diaphragm 144 having a central opening is provided within balancing port housing 136 and is constructed of a flexible, substantially air-tight, material with its periphery secured between balancing diaphragm retainer 132 and the balancing port housing 136. The inner edge at the central opening of balancing diaphragm 144 is sealingly secured between valve disc 22 and valve stem 116. So configured, balancing diaphragm 144 is disposed in a balancing cavity 146 formed between an end of valve disc 22, balancing diaphragm retainer 132, and balancing port housing 136.

Valve disc 22 is disposed within balanced port regulator valve 12 and moves along longitudinal axis 24 so that valve disc 22 moves between a closed position, sealingly engaging valve port 18, and an open position, disposed away and spaced apart from valve port 18. Valve disc 22 includes a sealing surface 26 disposed adjacent to an outer radial end 28 of valve disc 22, which is adapted to sealingly engage valve port 18 in the closed position to cut off the fluid flow through balanced port regulator valve 12. Sealing surface 26 may be a portion of a sealing insert secured within a cavity formed in valve disc 22 or may be a surface on valve disc 22 itself. The sealing surface 26 may include any suitable material or combination of materials, such as a resilient, compressible material. As shown, valve disc 22 is a balanced port valve disc and includes one or more disc passages 170 that extend through the valve disc 22 such that balancing cavity 146 is in fluid communication with the area adjacent to the outlet of valve port 18. The one or more disc passages 170 may be formed as a combination of one or more cylindrical passageways and one or more planar passageways that extend through valve disc 22. For example, as shown in FIG. 10, the disc passages 170 can include one or more cylindrical first sections 172 that extend longitudinally into valve disc 22 from sealing surface 26. First sections 172 are in fluid communication with one or more second sections 174, which could be cylindrical passage that extend radially through valve disc 22 or could be one large planar cavity that interconnects first sections 172. Second sections 174 are also in fluid communication with a third section 176 that extends longitudinally through valve disc 22 along longitudinal axis 24 and is in fluid communication with a longitudinal bore 178 formed through valve stem 116. Disc passages 170 may have any suitable cross-sectional shape (such as a round, ovular, or polygonal, for example).

With valve disc 22 in the open position (i.e., when sealing surface 26 of valve disc 22 does not sealingly engage valve port 18), fluid flows from inlet 14 to outlet 16 through valve port 18 and a portion of the fluid flows through disc passages 170 from the outlet of valve port 18 into the balancing cavity 146 and into contact with balancing diaphragm 144. The fluid enters valve disc 22 through first sections 172, through first sections 172 to second sections 174, through second sections 174 to third section 176, and exits valve disc 22 from third section 176 into bore 178 in valve stem 116. Fluid in bore 178 can then flow through a radial aperture 180 in valve stem 116 into one or more passages 182 formed through balancing diaphragm retainer 132 and into balancing cavity 146. As such, disc passages 170, bore 178, aperture 180, and passages 182 are configured to place the surface of balancing diaphragm 144 opposite valve port 18 (i.e., the right side of diaphragm 144 as shown in FIG. 10) in fluid communication with the upstream pressure bearing on valve disc 22. Accordingly, balancing diaphragm 144 provides a force on valve disc 22 in the direction of valve port 18 to compensate for the force applied to valve disc 22 due to the upstream pressure of the fluid passing through valve port 18, so that the force applied by balancing diaphragm 144 is approximately opposite and equal to the force of the upstream pressure on valve disc 22 to eliminate any influence of the upstream pressure and thereby allowing for more accurate control of the downstream pressure by fluid regulator 10.

Balanced trim assembly 19, and therefore valve disc 22 and valve stem 116, may be biased toward the open position by a biasing element 148 disposed between stem plate 118 and a seating surface of balancing diaphragm retainer 132. Biasing element 148 may be any suitable resilient member, such as a coil spring that is coaxially aligned with longitudinal axis 24. Because the seating surface of balancing diaphragm retainer 132 is stationary, the second end of the biasing element 148 biases stem plate 118 away from valve port 18. Biasing element 148 may be pre-stressed to provide a suitable biasing force regardless of the position of actuator stem 112. Moreover, biasing element 148 may be chosen from a plurality of biasing elements that each have a unique spring characteristics (e.g., spring force) to tune the fluid regulator 10 to achieve desired flow conditions.

Actuator 20 includes a housing 42 and a control assembly 36 disposed within housing 42. Housing 42 includes an upper housing component 42a and a lower housing component 42b secured together with a plurality of fasteners. Lower housing component 42b defines a control cavity 44 and actuator mouth 46. Upper housing component 42a defines a relief cavity 48 and a tower portion 50 for accommodating a portion of control assembly 36.

Control assembly 36 includes actuator stem 112, a diaphragm subassembly 52, and a release valve 56. Diaphragm subassembly 52 includes a diaphragm 58, a control spring 62, a combination spring seat 68, and a control spring seat 76. Diaphragm 58 is constructed of a flexible, substantially air-tight, material and its periphery is sealingly secured between upper housing component 42a and lower housing component 42b to separate relief cavity 48 from control cavity 44. Combination spring seat 68 supports control spring 62 and is disposed on top of diaphragm 58.

A pusher post 60 includes a sealing cup portion 84, a yoke 88, and a coupler 100 and is secured to combination spring seat 68 by connector 182, with diaphragm 58 secured between pusher post 60 and connector 182. Sealing cup portion 84 is concaved and generally disc-shaped, extends circumferentially about a mid-portion of pusher post 60, and is located just below diaphragm 58. Yoke 88 is adapted to accommodate coupler 100, which interacts with a control arm 108 to enable operable connection between diaphragm subassembly 52 and balanced trim assembly 19. Control spring 62 is disposed on top of combination spring seat 68 and within tower portion 50 of upper housing component 42a. Control spring seat 76 is threaded into tower portion 50 and compresses control spring 62 against combination spring seat 68. In the example shown, control spring 62 is a compression coil spring. Accordingly, control spring 62 is grounded against upper housing component 42a and applies a downward force to combination spring seat 68 and diaphragm 58. The force generated by control spring 62 is adjustable by adjusting the position of control spring seat 76 in tower portion 50, and therefore the control pressure of fluid regulator 10 is also adjustable.

Control spring 62 acts against the pressure in control cavity 44, which is sensed by diaphragm 58. This pressure is the same pressure as that at outlet 16 of balanced port regulator valve 12. Accordingly, the force applied by control spring 62 sets the outlet pressure to a desired setpoint or control pressure for fluid regulator 10.

A sense tube 150 fluidly connects outlet 16 and control cavity 44. First end 152 is positioned to provide flow communication with control cavity 44 and second end 154 is disposed adjacent outlet 16, preferably generally adjacent a distal portion of outlet 16. Intermediate portion 156 is preferably disposed generally adjacent an intermediate portion of outlet 16. Sense tube 150 senses the pressure in outlet 16 and, if the sensed pressure is too low, the pressure in control cavity 44 drops accordingly by virtue of the flow communication provided by sense tube 150. During a first or normal operational mode, control assembly 36 senses the pressure at outlet 16 of balanced port regulator valve 12 (i.e., the outlet pressure) through sense tube 150 and controls a position of valve disc 22 through movement of actuator stem 112, such that the outlet pressure approximately equals a predetermined setpoint or control pressure.

Actuator stem 112 is movable along longitudinal axis 24 and engages control arm 108. Actuator stem 112 has a generally cylindrical, linear body 160 having a first end 162 with a slot 164 to receive a protrusion 110 of control arm 108 and an opposing second end 166. Control arm 108 is a slightly curved lever and includes a fulcrum end 108a and a free end 108b, with protrusion 110 positioned between fulcrum end 108a and free end 108b. Fulcrum end 108a is pivotally coupled to lower housing component 42b and free end 108b is received between a top portion and a pin of coupler 100.

As the pressure at outlet 16 of balanced port regulator valve 12 increases the pressure in control cavity 44 of actuator 20 also increases due to the fluid communication through sense tube 150. The pressure increase in control cavity 44 moves diaphragm 58 upwards (in the orientation shown in FIG. 1A), which rotates control arm 108 in a counterclockwise direction and moves actuator stem 112 toward valve port 18. As actuator stem 112 moves toward valve port 18 it contacts stem plate 118 and pushes balanced trim assembly 19, and therefore valve disc 22, toward valve port 18 and toward the closed position. Conversely, as the pressure at outlet 16 of balanced port regulator valve 12 decreases the pressure in control cavity 44 also decreases. The pressure decrease in control cavity 44 moves diaphragm 58 downwards (in the orientation shown in FIG. 1A), which rotates control arm 108 in a clockwise direction and moves actuator stem 112 away from valve port 18. However, since actuator stem 112 is not connected to stem plate 118, movement of actuator stem 112 away from valve port 18 will not pull balanced trim assembly 19 away from valve port 18 and toward the open position. Rather, movement of balanced trim assembly 19 away from valve port 18 is controlled by biasing element 148. In normal operation, as the actuator stem 112 moves away from valve port 18 (right in the orientation shown in FIGS. 1A-C), the biasing element 148 maintains the contact between the stem plate 118 and the actuator stem 112, which causes the balanced trim assembly 19 to move away from the valve port 18 and permits fluid flow from the inlet 14 to the outlet 16. However, as discussed above, there may be instances in which the balanced trim assembly 19 has a slowed speed of response.

FIGS. 2A-6 illustrate an example self-operated fluid regulator 10A that can overcome balanced trim assembly responsiveness issues. In the examples described below, the balanced trim assembly is connected to the actuator stem through a connector assembly that can include a snap ring that connects a retainer to the actuator stem. In the examples shown herein, with a bigger downstream flow, the pressure in the lower casing of the actuator will decrease, the diaphragm assembly will move downward and drive the lever to rotate, and the lever will drive the actuator stem away from the valve port. Because the actuator stem and the balanced port retainer are connected, the actuator stem will assist in moving the balanced trim assembly away from the valve port, rather than just moving out of the way and allowing the balanced trim assembly to move on its own. This ensures that the balanced trim assembly will move and open the orifice in time and can also improve the speed of response of the fluid regulator.

Figure 2A:
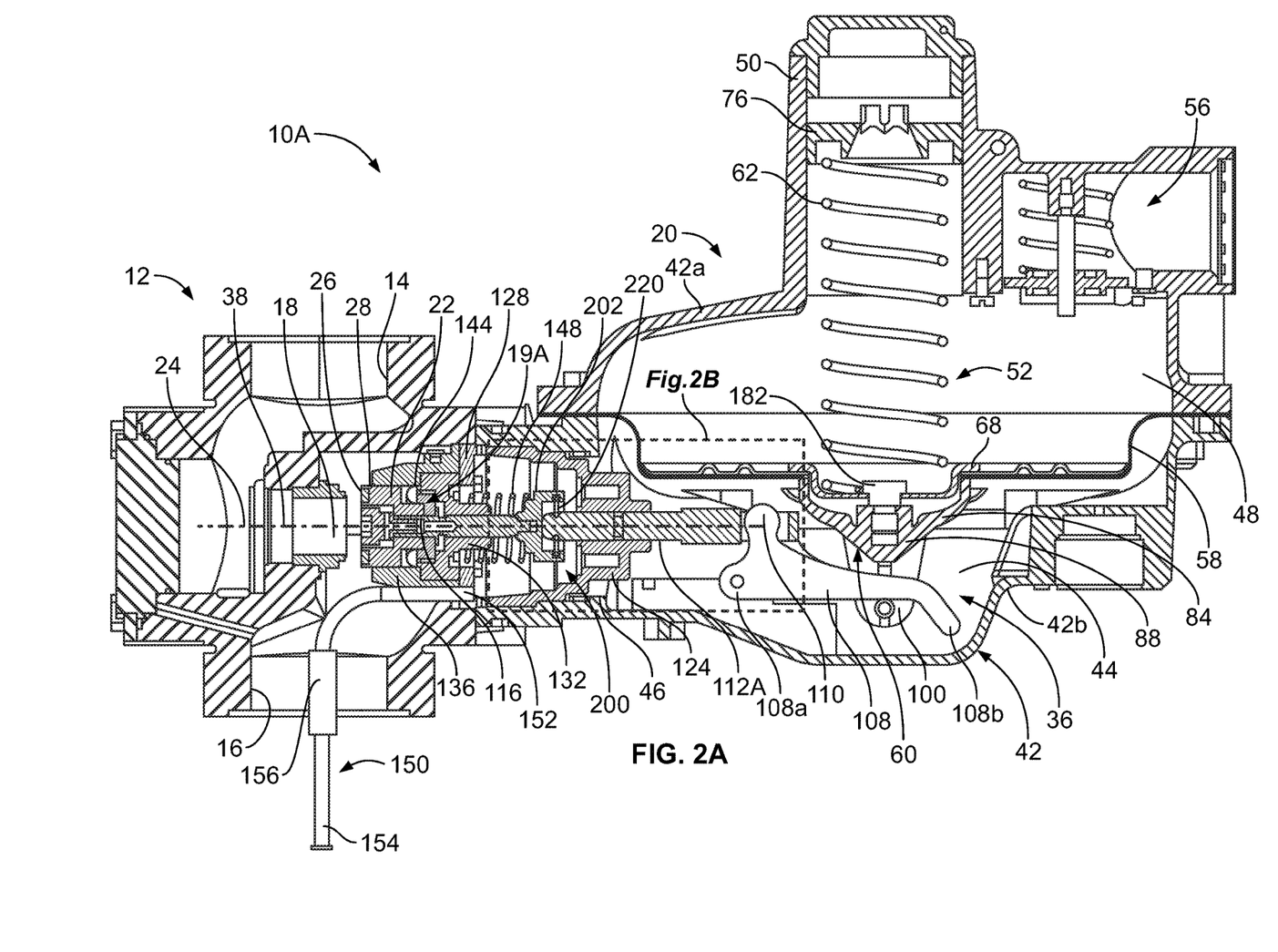
FIG. 2A is a partial cross-sectional view of an example fluid regulator with a balanced port regulator valve having a balanced trim assembly according to the present invention.

Fluid regulator 10A is essentially the same as fluid regulator 10, except for the structure of actuator stem 112 and balanced trim assembly 19 of fluid regulator 10. Identical components between fluid regulator 10A and fluid regulator 10 use the same reference numbers, similar components use the same reference number with an "A", and only the differences between fluid regulator 10A and fluid regulator 10 are described in detail below.

To provide the operable connection between actuator stem 112A and valve disc 22 in fluid regulator 10A so that actuator stem 112A and valve disc 22 move together toward and away from valve port 18 between the closed and open positions, actuator stem 112A is removably connected to balanced trim assembly 19A by a connector assembly 200 that includes a retainer 202 and a snap ring 220. Referring to FIGS. 2B-6, retainer 202 replaces stem plate 118 and is secured to valve stem 116 by threads, welding, etc. Retainer 202 has a generally cylindrical body 204 that is secured to valve stem 116 to operably connect and secure valve disc 22 to retainer 202 through valve stem 116. A cylindrical cavity 206 extends longitudinally into body 204 and is dimensioned to receive second end 166A of actuator stem 112A when second end 166A of actuator stem 112A extends into cavity 206 of retainer 202. A circumferential groove 208 is formed radially around cavity 206 in a wall 210 of body 204 and extending radially from cavity 206 and is configured to receive snap ring 220 when connector assembly 200 is assembled with actuator stem 112A. Like the stem plate 118, the retainer 202 includes a surface that receives the biasing element 148, which biases the retainer 202 away from valve port 18.

Figure 2B:
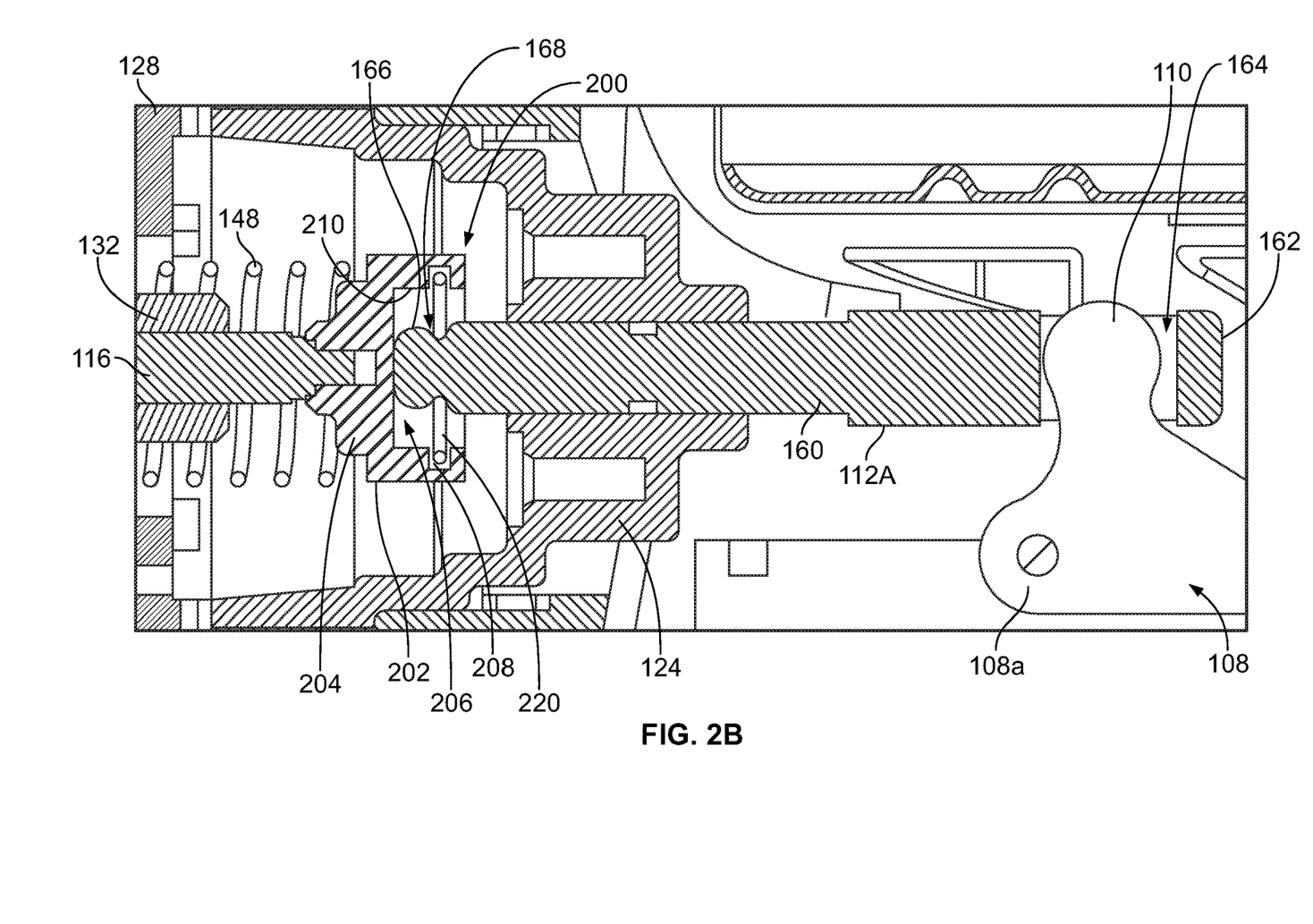
FIG. 2B is an enlarged view of a portion of the fluid regulator of FIG. 2A.
Figure 4:
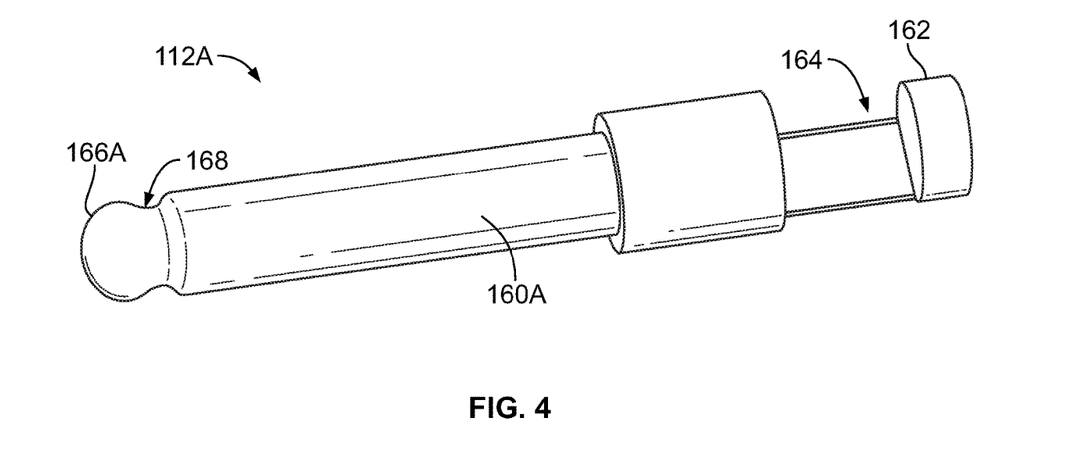
FIG. 4 is a side view of the main stem of the fluid regulator of FIG. 2A.
Figure 5:
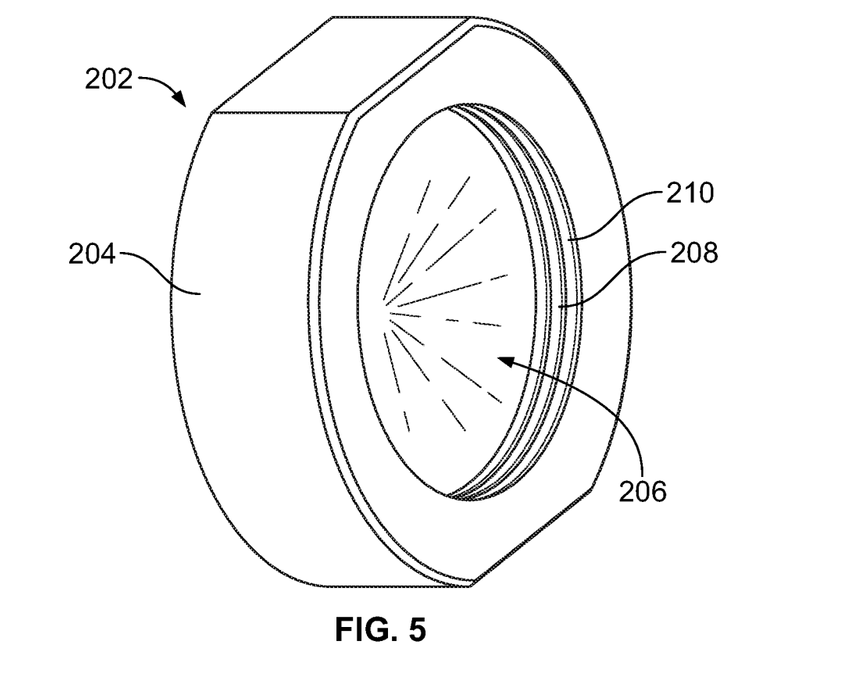
FIG. 5 is a perspective view of the retainer of the fluid regulator of FIG. 2A.

Actuator stem 112A is movable along longitudinal axis 24 and engages control arm 108 so that movement of actuator stem 112A along longitudinal axis 24 moves valve disc 22 between the open and closed positions as diaphragm 58 flexes due to variations in the downstream pressure at outlet 16. Actuator stem 112 has a generally cylindrical, linear body 160A having a first end 162 with a slot 164 to receive protrusion 110 of control arm 108 and a second end 166A with a circumferential groove 168 formed around an outer surface of body 160A to receive snap ring 220 of connector assembly 200.

Figure 3:
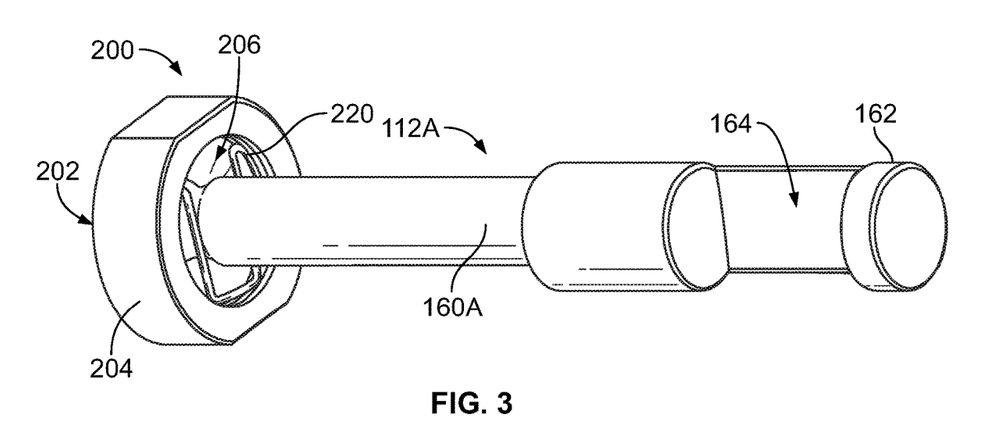
FIG. 3 is a perspective view of the main stem, retainer, and snap ring of the fluid regulator of FIG. 2A.
Figure 6:
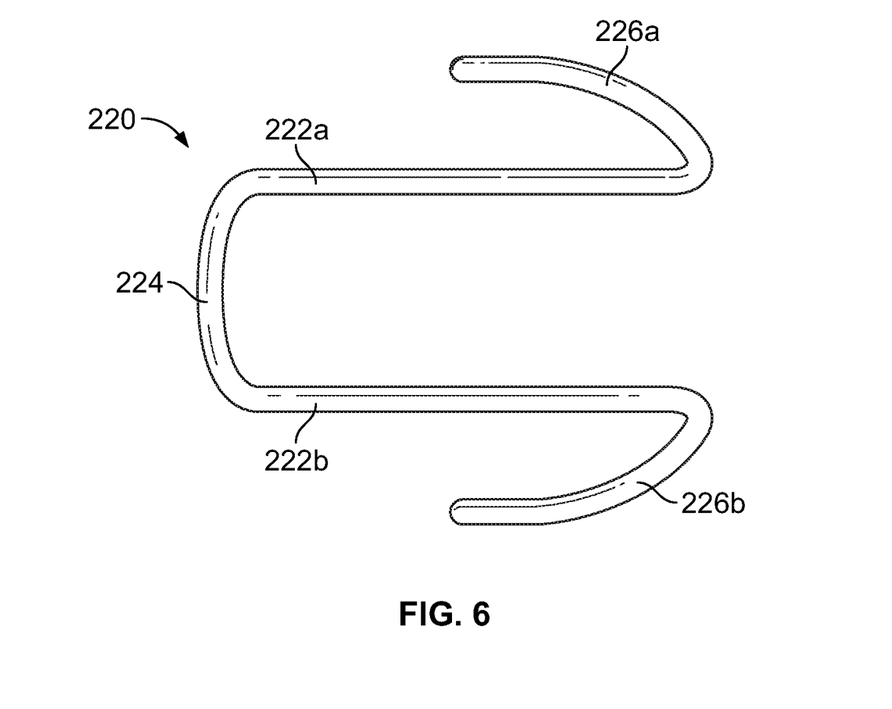
FIG. 6 is a side view of the snap ring of the fluid regulator of FIG. 2A.

Snap ring 220 removably connects actuator stem 112A to retainer 202 so that movement of actuator stem 112A also moves retainer 202, and therefore balanced trim assembly 19A. Snap ring 220 engages groove 208 in retainer 202 and groove 168 in actuator stem 112 to connect retainer 202 to actuator stem 112. In the example shown, snap ring 220 has a pair of parallel main arms 222a, 222b and a transverse arm 224 that extends between first ends of main arms 222a, 222b to connect main arms 222a, 222b. An arcuate first retaining arm 226a extends from a second end of main arm 222a and an arcuate second retaining arm 226b extends from a second end of main arm 222b. When connector assembly 200 is assembled in fluid regulator 10, parallel main arms 222a, 222b engage groove 168 in actuator stem 112 and transverse arm 224 and first and second retaining arms 226a, 226b engage groove 208 in wall 210 of retainer 202 to connect actuator stem 112 to balanced trim assembly 19 and, therefore, to valve disc 22.

Therefore, in fluid regulator 10A, just as in fluid regulator 10, as the pressure at outlet 16 of balanced port regulator valve 12 increases the pressure in control cavity 44 of actuator 20 also increases, diaphragm 58 moves upwards (in the orientation shown in FIG. 2A), which rotates control arm 108 in a counterclockwise direction, and actuator stem 112A moves toward valve port 18 to push balanced trim assembly 19A, and therefore valve disc 22, toward valve port 18 and toward the closed position. However, unlike fluid regulator 10, in fluid regulator 10A, as the pressure at outlet 16 of balanced port regulator valve 12 decreases the pressure in control cavity 44 also decreases, diaphragm 58 moves downwards (in the orientation shown in FIG. 2A), which rotates control arm 108 in a clockwise direction, and actuator stem 112A moves away from valve port 18 and pulls balanced trim assembly 19A, and therefore valve disc 22, away from valve port 18 and toward the open position.

Therefore, actuator stem 112A assists in pulling valve disc 22 away from valve port 18, which can increase the speed of response and ensure movement of valve disc 22.

As noted above, one feature of connector assembly 200 is that it removably connects actuator stem 112A to balanced trim assembly 19A, which enables actuator 20 to be removable from balanced port regulator valve 12 while balanced port regulator valve 12 stays in line (e.g., to perform maintenance on the fluid regulator 10A). Because actuator stem 112A and balanced trim assembly 19A are internal to fluid regulator 10A and are thus inaccessible to traditional tools, the connection between them must facilitate removal of actuator 20 and reconnection of actuator stem 112A and balanced trim assembly 19A when actuator 20 is reconnected. As used herein, a removable connection (or connector) refers to a connection (or connector) that enables an actuator stem to be coupled to or decoupled from a balanced trim assembly or a component thereof solely by inserting or removing the actuator stem (e.g., along the longitudinal axis 24). While retainer 202 and snap ring 220 provide this functionality, other removable connections may also be possible.

While various embodiments have been described above, this disclosure is not intended to be limited thereto. Variations can be made to the disclosed embodiments that are still within the scope of the appended claims.

What is claimed is:

1. A fluid regulator, comprising:
a balanced port regulator valve having an inlet, an outlet, a valve port disposed between the inlet and the outlet, and a valve disc that is movable along a longitudinal axis between a closed position in which the valve disc sealingly engages the valve port and an open position in which the valve disc is spaced apart from the valve port;
a valve stem that is coupled to the valve disc;
an actuator coupled to the regulator valve and responsive to fluid pressure to move an actuator stem along the longitudinal axis; and
a connector assembly that operably and removably connects the valve stem to the actuator stem, wherein a biasing member bears on the connector assembly to bias the valve disc away from the valve port.

2. The fluid regulator of claim 1, wherein movement of the actuator stem along the longitudinal axis in a direction away from the valve port moves the valve disc along with the actuator stem in the direction away from the valve port.

3. The fluid regulator of claim 1, wherein the connector assembly comprises a retainer and a first end of the retainer is secured to the valve stem and a second end of the retainer is connected to the actuator stem.

4. The fluid regulator of claim 3, wherein the connector assembly comprises a snap ring that removably connects the retainer to the actuator stem.

5. The fluid regulator of claim 4, wherein the retainer comprises a generally cylindrical body, a cylindrical cavity extending longitudinally into the body, and a circumferential groove formed in a wall of the cavity.

6. The fluid regulator of claim 5, wherein the actuator stem comprises a generally cylindrical body and a circumferential groove formed around an outer surface of the body at an end of the body.

7. The fluid regulator of claim 6, wherein the end of the body of the actuator stem extends into the cavity of the retainer and the snap ring engages the circumferential groove in the retainer and the circumferential groove in the actuator stem to removably connect the retainer to the actuator stem.

8. The fluid regulator of claim 7, wherein the snap ring comprises:
two parallel main arms configured to engage the groove in the actuator stem;
a transverse arm extending between and connecting first ends of the main arms;
an arcuate first retaining arm extending from a second end of one of the main arms; and
an arcuate second retaining arm extending from a second end of the other of the main arms; wherein
the transverse arm and the first and second retaining arms extend into and engage the groove in the retainer.

9. The fluid regulator of claim 1, wherein the balanced port regulator valve further comprises a diaphragm, and wherein a pressure at the inlet acts on the diaphragm to urge the valve disc toward the valve port.

10. A pressure regulator, comprising:
a valve body having an inlet, and outlet, and a port between the inlet and the outlet;
a balanced trim assembly having a valve stem, a valve disc that is coupled to a first end of the valve stem, and a connector assembly that is coupled to a second end of the valve stem;
an actuator stem that is removably coupled to the connector assembly and is configured to be moved in response to fluid pressure at the outlet;
a biasing member that bears on a surface of the connector assembly to bias the valve disc away from the port.

11. The pressure regulator of claim 10, further comprising a balancing port housing, a balancing diaphragm retainer, and a balancing diaphragm that is coupled to the valve stem and captured between the balancing port housing and the balancing diaphragm retainer.

12. The pressure regulator of claim 11, wherein a balancing cavity is formed between the balancing diaphragm and the balancing port housing.

13. The pressure regulator of claim 12, wherein the valve stem comprises a passage between the inlet and the balancing cavity.

14. The pressure regulator of claim 13, wherein a fluid pressure at the inlet operates on the balancing diaphragm to generate a force in the direction of the port.

15. The pressure regulator of claim 10, wherein the connector assembly comprises a retainer.

16. The pressure regulator of claim 15, wherein the connector assembly comprises a snap ring that removably connects the retainer to the actuator stem.

17. The pressure regulator of claim 15, wherein the retainer comprises a generally cylindrical body, a cylindrical cavity extending longitudinally into the body, and a circumferential groove formed in a wall of the cylindrical cavity.

18. The pressure regulator of claim 17, wherein the actuator stem comprises a generally cylindrical body and a circumferential groove formed around an outer surface of the body at an end of the body.

19. The pressure regulator of claim 18, wherein the end of the body of the actuator stem extends into the cylindrical cavity of the retainer and a snap ring engages the circumferential groove in the retainer and the circumferential groove in the actuator stem to removably connect the retainer to the actuator stem.

* * * * *

UNITED STATES PATENT AND TRADEMARK OFFICE
CERTIFICATE OF CORRECTION

PATENT NO. : 10,782,713 B2
APPLICATION NO. : 16/190528
DATED : September 22, 2020
INVENTOR(S) : Min Wang et al.

It is certified that error appears in the above-identified patent and that said Letters Patent is hereby corrected as shown below:

On the Title Page

At item (72), Line 3, "Whiteright, TX (US);" should be -- Whitewright, TX (US); --.

In the Specification

At Column 2, Line 37, "an circumferential" should be -- a circumferential --.

At Column 3, Line 22, "an circumferential" should be -- a circumferential --.

At Column 5, Line 13, "FIG. 10," should be -- FIG. 1C, --.

At Column 5, Line 43, "FIG. 10)" should be -- FIG. 1C) --.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*